United States Patent
Van Buskirk

(10) Patent No.: US 9,982,146 B2
(45) Date of Patent: May 29, 2018

(54) DUAL-CURE COMPOSITIONS USEFUL FOR COATING METAL SUBSTRATES AND PROCESSES USING THE COMPOSITIONS

(71) Applicant: PPG Industries Ohio, Inc., Cleveland, OH (US)

(72) Inventor: Ellor James Van Buskirk, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 347 days.

(21) Appl. No.: 14/408,738

(22) PCT Filed: Jun. 18, 2013

(86) PCT No.: PCT/US2013/046243
§ 371 (c)(1),
(2) Date: Dec. 17, 2014

(87) PCT Pub. No.: WO2013/192140
PCT Pub. Date: Dec. 27, 2013

(65) Prior Publication Data
US 2015/0166800 A1   Jun. 18, 2015

Related U.S. Application Data

(60) Provisional application No. 61/660,923, filed on Jun. 18, 2012.

(51) Int. Cl.
| | | |
|---|---|---|
| *C09D 5/44* | (2006.01) | |
| *C08G 18/58* | (2006.01) | |
| *C08G 18/80* | (2006.01) | |
| *C08G 18/81* | (2006.01) | |
| *C09D 175/14* | (2006.01) | |
| *C09D 5/08* | (2006.01) | |

(52) U.S. Cl.
CPC ........... *C09D 5/4473* (2013.01); *C08G 18/58* (2013.01); *C08G 18/8064* (2013.01); *C08G 18/8175* (2013.01); *C09D 5/08* (2013.01); *C09D 5/443* (2013.01); *C09D 5/4453* (2013.01); *C09D 5/4465* (2013.01); *C09D 5/4476* (2013.01); *C09D 175/14* (2013.01)

(58) Field of Classification Search
CPC ........ C09D 5/4473; C09D 5/08; C09D 5/443; C09D 5/4453; C09D 5/4465; C09D 5/4476; C09D 175/14; C09D 5/4496; C09D 5/4411; C09D 175/16; C08G 18/58; C08G 18/8064; C08G 18/8175; C08G 18/807; C08G 18/4277; C08G 18/6659; C08G 18/672; C08G 18/7837; C08G 18/792; C08G 18/0823; B05D 7/546; B05D 1/007; B05D 3/0254; C14C 11/006

See application file for complete search history.

(56) References Cited

U.S. PATENT DOCUMENTS

| | | | |
|---|---|---|---|
| 3,793,278 A | | 2/1974 | De Bona |
| 3,928,157 A | | 12/1975 | Suematsu et al. |
| 3,959,106 A | | 5/1976 | Bosso et al. |
| 4,007,154 A | | 2/1977 | Schimmel et al. |
| 4,104,147 A | | 8/1978 | Marchetti et al. |
| 4,147,679 A | | 4/1979 | Scriven et al. |
| 4,157,924 A | | 6/1979 | Elms et al. |
| 4,186,036 A | | 1/1980 | Elms et al. |
| 4,403,003 A | | 9/1983 | Backhouse |
| 4,452,681 A | * | 6/1984 | Moriarity ........... C08G 18/8064 204/489 |
| 4,650,718 A | | 3/1987 | Simpson et al. |
| 4,739,019 A | | 4/1988 | Schappert et al. |
| 4,941,930 A | | 7/1990 | Charles et al. |
| 5,071,904 A | | 12/1991 | Martin et al. |
| 5,238,506 A | | 8/1993 | Cape et al. |
| 5,260,135 A | | 11/1993 | Corrigan et al. |
| 5,294,265 A | | 3/1994 | Gray et al. |
| 5,306,526 A | | 4/1994 | Gray et al. |
| 5,483,012 A | | 1/1996 | Midogohchi et al. |
| 5,653,790 A | | 8/1997 | Fotinos et al. |
| 5,814,410 A | | 9/1998 | Singer et al. |
| 5,891,981 A | | 4/1999 | Mauer et al. |
| 2003/0096905 A1 | * | 5/2003 | Tazzia ................. C09D 5/4411 524/800 |
| 2004/0159548 A1 | | 8/2004 | Peffer et al. |
| 2005/0070674 A1 | * | 3/2005 | Rodrigues .............. C08G 18/10 525/523 |
| 2010/0227942 A1 | | 9/2010 | Spyrou et al. |

FOREIGN PATENT DOCUMENTS

| | | |
|---|---|---|
| RU | 94015175 A1 | 4/1996 |
| RU | 94033112 A1 | 8/1996 |
| RU | 2448988 C2 | 4/2012 |
| WO | 98014379 A1 | 4/1998 |
| WO | 02/070613 A2 | 9/2002 |

* cited by examiner

Primary Examiner — Xiuyu Tai
(74) Attorney, Agent, or Firm — Krisanne Shideler

(57) ABSTRACT

A film-forming composition capable of undergoing dual cure, comprising: (1) a resin component comprising at least one polyepoxide; and (2) a radiation-curable diluent comprising a reaction product of a composition comprising: (a) a partially capped polyisocyanate; and (b) an ethylenically unsaturated monomer having active hydrogen functional groups capable of reacting with isocyanate groups. Also provided are processes for improving corrosion resistance of a metal substrate using the above composition.

20 Claims, No Drawings

DUAL-CURE COMPOSITIONS USEFUL FOR COATING METAL SUBSTRATES AND PROCESSES USING THE COMPOSITIONS

CROSS-REFERENCE TO RELATED APPLICATIONS

This application claims the benefit of U.S. Provisional Patent Application Ser. No. 61/660,923 filed Jun. 18, 2012, incorporated herein by reference in its entirety.

FIELD OF THE INVENTION

The present invention relates to film-forming compositions capable of undergoing dual cure, and processes for improving the corrosion resistance of vulnerable metals such as cold rolled steel using the film-forming compositions.

BACKGROUND OF THE INVENTION

There has long been a disparity in the corrosion resistance of various portions of an assembled automotive vehicle. Areas accessible to modern coatings systems benefit from galvanized substrates, well developed zinc phosphate pretreatments, purpose-designed electrocoats and suitable topcoats that withstand long term weathering and corrosive environments.

In contrast to the superb performance of coatings on exposed areas which are readily accessible to cleaning, pretreating and coating, there are small areas of a vehicle which are problematic. In an automotive body shop, oily cold rolled and galvanized steels are formed, folded, and welded together from approximately 250 pieces of sheet steel to make a "body in white", so named for its light colored appearance. In this assembled vehicle there are joints, seams and folded hems that are remarkably inaccessible to processing fluids such as alkaline cleaners, pretreating chemicals, and electrocoats, and hence vulnerable to corrosion. For welded seams, slight variations in part dimension and in heat distortion from spot welding result in gap volumes which are high in both aspect ratio and in variability.

Various processes are in place to provide generally adequate corrosion resistance to seams and hems on a vehicle body. High viscosity structural adhesives designed for peel strength and corrosion resistance provide a measure of protection. They are applied, typically as a bead, to oily metal in the body shop before the piece is folded, bent, or welded into an inaccessible enclosed volume. If the currently available structural adhesives could be applied consistently to perfectly fill the void volume formed by hems, seams, and the like, results would be fully satisfactory. The variation in gap volume in high speed production prevents such a perfect application of adhesive or sealant. There are often gaps, or "holidays", that form where the adhesive does not reach and bare metal is exposed. Production economics preclude a process of applying an excess and wiping off material that squeezes out.

It would be desirable to provide a film-forming composition which can be applied to such substrate surfaces that are exposed to voids during piece shaping and joining, demonstrating enhanced corrosion resistance. It would be additionally desirable for such compositions to demonstrate low V.O.C., compatibility with (i. e., an ability to be applied by) existing robots in OEM body shops to minimize equipment retro-fitting, and an ability to withstand pretreatment chemicals.

SUMMARY OF THE INVENTION

The present invention provides a film-forming composition capable of undergoing dual cure, comprising:
(1) a resin component comprising at least one polyepoxide; and
(2) a radiation-curable diluent comprising a reaction product of a composition comprising:
(a) a partially capped polyisocyanate; and
(b) an ethylenically unsaturated monomer having active hydrogen functional groups capable of reacting with isocyanate groups.

Also provided is a process for improving corrosion resistance of a metal substrate comprising:
(a) applying to the substrate the film-forming composition described above;
(b) exposing the substrate to actinic radiation to effect polymerization of ethylenically unsaturated groups in the radiation-curable diluent;
(c) electrophoretically depositing on the substrate a curable, electrodepositable coating composition comprising:
(1) a resin component containing an active hydrogen-containing, cationic salt group-containing resin comprising an acrylic, polyester, polyurethane and/or polyepoxide polymer; and
(2) an at least partially capped polyisocyanate curing agent; and
(d) heating the substrate to a temperature and for a time sufficient to effect cure of the polyisocyanates and active hydrogen functional groups.

DETAILED DESCRIPTION

Other than in the operating examples, or unless otherwise expressly specified, all of the numerical ranges, amounts, values and percentages such as those for amounts of materials, times and temperatures of reaction, ratios of amounts, values for molecular weight (whether number average molecular weight ("$M_n$") or weight average molecular weight ("$M_w$")), and others in the following portion of the specification may be read as if prefaced by the word "about" even though the term "about" may not expressly appear with the value, amount or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

Plural referents as used herein encompass singular and vice versa. For example, while the invention has been described in terms of "a" cationic acrylic resin derived from an epoxy functional acrylic resin, a plurality, including a mixture of such resins can be used.

Any numeric references to amounts, unless otherwise specified, are "by weight". The term "equivalent weight" is a calculated value based on the relative amounts of the various ingredients used in making the specified material and is based on the solids of the specified material. The relative amounts are those that result in the theoretical weight in grams of the material, like a polymer, produced from the ingredients and give a theoretical number of the particular functional group that is present in the resulting polymer. The theoretical polymer weight is divided by the theoretical number of equivalents of functional groups to give the equivalent weight. For example, urethane equivalent weight is based on the equivalents of urethane groups in the polyurethane material.

As used herein, the term "polymer" is meant to refer to prepolymers, oligomers and both homopolymers and copolymers; the prefix "poly" refers to two or more.

Also for molecular weights, whether number average ($M_n$) or weight average ($M_w$), these quantities are determined by gel permeation chromatography using polystyrene as standards as is well known to those skilled in the art and such as is discussed in U.S. Pat. No. 4,739,019, at column 4, lines 2-45.

As used herein "based on total weight of the resin solids" of the composition means that the amount of the component added during the formation of the composition is based upon the total weight of the resin solids (non-volatiles) of the film forming materials, polyurethanes, cross-linkers, and polymers present during the formation of the composition, but not including any water, solvent, or any additive solids such as hindered amine stabilizers, photoinitiators, pigments including extender pigments and fillers, flow modifiers, catalysts, and UV light absorbers.

As used herein, "formed from" denotes open, e.g., "comprising," claim language. As such, it is intended that a composition "formed from" a list of recited components be a composition comprising at least these recited components, and can further comprise other non-recited components during the composition's formation.

The term "curable", as used for example in connection with a curable composition, means that the indicated composition is polymerizable or cross linkable through functional groups, e.g., by means that include, but are not limited to, thermal (including ambient cure) and/or catalytic exposure.

The term "cure", "cured" or similar terms, as used in connection with a cured or curable composition, e.g., a "cured composition" of some specific description, means that at least a portion of the polymerizable and/or crosslinkable components that form the curable composition is polymerized and/or crosslinked. Additionally, curing of a polymerizable composition refers to subjecting said composition to curing conditions such as but not limited to thermal curing, leading to the reaction of the reactive functional groups of the composition, and resulting in polymerization and formation of a polymerizate. When a polymerizable composition is subjected to curing conditions, following polymerization and after reaction of most of the reactive end groups occurs, the rate of reaction of the remaining unreacted reactive end groups becomes progressively slower. The polymerizable composition can be subjected to curing conditions until it is at least partially cured. The term "at least partially cured" means subjecting the polymerizable composition to curing conditions, wherein reaction of at least a portion of the reactive groups of the composition occurs, to form a polymerizate.

The film-forming composition of the present invention is capable of undergoing dual cure as described above, and comprises (1) a resin component and (2) a radiation-curable diluent. By "capable of undergoing dual cure" is meant that the composition contains components with reactive functional groups such that the composition may cure (or "crosslink") via at least two different chemical reaction mechanisms. For example, the composition may contain one or more components with ethylenically unsaturated groups that cure upon exposure to actinic radiation, and one or more other components the same as or different than those with ethylenically unsaturated groups, which contain different reactive functional groups that cure, for example, thermally. Examples of such different functional groups are discussed in detail below. The compositions of the present invention undergo dual cure such that at least partial cure of each type of reactive functionality present in the components takes place under appropriate conditions.

The resin component (1) is present in the film-forming composition in an amount of 5 to 75 percent by weight, such as 10 to 75 percent by weight, or 10 to 60 percent by weight, or 25 to 50 percent by weight, based on the total weight of resin solids in the film-forming composition. The resin component (1) comprises at least one polyepoxide. The polyepoxide by definition has at least two 1,2-epoxy groups. In general the epoxide equivalent weight of the polyepoxide will range from 100 to about 2000, typically from about 180 to 500. The epoxy compounds may be saturated or unsaturated, cyclic or acyclic, aliphatic, alicyclic, aromatic or heterocyclic. They may contain substituents such as halogen, hydroxyl, and ether groups.

Examples of polyepoxides are those having a 1,2-epoxy equivalency greater than one and usually about two; that is, polyepoxides which have on average two epoxide groups per molecule. The most commonly used polyepoxides are polyglycidyl ethers of cyclic polyols, for example, polyglycidyl ethers of polyhydric phenols such as 2,2-bis-(4-hydroxyphenyl)propane (Bisphenol A), resorcinol, hydroquinone, benzenedimethanol, phloroglucinol, and catechol; or polyglycidyl ethers of polyhydric alcohols such as alicyclic polyols, particularly cycloaliphatic polyols such as 1,2-cyclohexane diol, 1,4-cyclohexane diol, 2,2-bis(4-hydroxycyclohexyl)propane, 1,1-bis(4-hydroxycyclohexyl)ethane, 2-methyl-1,1-bis(4-hydroxycyclohexyl)propane, 2,2-bis(4-hydroxy-3-tertiarybutylcyclohexyl)propane, 1,3-bis(hydroxymethyl)cyclohexane and 1,2-bis(hydroxymethyl)cyclohexane. Examples of aliphatic polyols include, inter alia, trimethylpentanediol and neopentyl glycol.

Particularly suitable polyepoxides have an epoxy equivalent weight less than 200 grams/equivalent. Examples include EPON 828, commercially available from Dow Chemical Corporation.

In certain embodiments of the present invention, the resin component (1) comprises at least two polyepoxides. The additional polyepoxides may be present in an amount up to 50 percent by weight, such as up to 25 percent by weight, typically 10 to 15 percent by weight, based on the total weight of resin solids in the film-forming composition. The additional polyepoxides may be any of those disclosed above, and/or polyepoxide chain-extended by reacting together a polyepoxide and a polyhydroxyl group-containing material such as alcoholic hydroxyl group-containing materials and phenolic hydroxyl group-containing materials to chain extend or build the molecular weight of the polyepoxide.

A chain-extended polyepoxide is typically prepared by reacting together the polyepoxide and polyhydroxyl group-containing material neat or in the presence of an inert organic solvent such as a ketone, including methyl isobutyl ketone and methyl amyl ketone, aromatics such as toluene and xylene, and glycol ethers such as the dimethyl ether of diethylene glycol. The reaction is usually conducted at a temperature of about 80° C. to 160° C. for about 30 to 180 minutes until an epoxy group-containing resinous reaction product is obtained.

The equivalent ratio of reactants; i. e., epoxy:polyhydroxyl group-containing material is typically from about 1.00:0.75 to 1.00:2.00.

In particular embodiments, at least one of the polyepoxides has an equivalent weight of 450 to 550 grams/equivalent. Examples of suitable polyepoxides include, inter alia, EPON 1001, available from Dow Chemical Corporation. If the polyepoxide is a solid at room temperature, it may be dissolved in the radiation-curable diluent described below.

The resin component (1) may further comprise one or more free polyhydric phenols such as 2,2-bis-(4-hydroxyphenyl)propane (Bisphenol A), resorcinol, hydroquinone, benzenedimethanol, phloroglucinol, and catechol.

The film-forming composition of the present invention further comprises (2) a radiation-curable diluent. The radiation-curable diluent comprises a reaction product of a composition comprising: (a) a partially capped polyisocyanate and (b) an ethylenically unsaturated monomer having active hydrogen functional groups capable of reacting with isocyanate groups.

Non-limiting examples of polyisocyanates can include one or more of aliphatic polyisocyanates, cycloaliphatic polyisocyanates wherein one or more of the isocyanato groups are attached directly to the cycloaliphatic ring, cycloaliphatic polyisocyanates wherein one or more of the isocyanato groups are not attached directly to the cycloaliphatic ring, aromatic polyisocyanates wherein one or more of the isocyanato groups are attached directly to the aromatic ring, and aromatic polyisocyanates wherein one or more of the isocyanato groups are not attached directly to the aromatic ring. Aromatic polyisocyanates are typically most suitable because they demonstrate better adhesion to oily metal surfaces, such as untreated/uncleaned cold rolled steel. Diisocyanates are used most often, although higher polyisocyanates can be used in place of or in combination with diisocyanates.

Examples of aliphatic polyisocyanates suitable for use include straight chain aliphatic diisocyanates such as 1,4-tetramethylene diisocyanate and 1,6-hexamethylene diisocyanate. Also, cycloaliphatic diisocyanates can be employed. Examples include isophorone diisocyanate and 4,4'-methylene-bis-(cyclohexyl isocyanate). Examples of suitable aralkyl diisocyanates are meta-xylylene diisocyanate and α,α,α',α'-tetramethylmeta-xylylene diisocyanate.

Examples of aromatic polyisocyanates wherein the isocyanate groups are not bonded directly to the aromatic ring can include but are not limited to bis(isocyanatoethyl) benzene, α,α,α',α'-tetramethylxylene diisocyanate, 1,3-bis (1-isocyanato-1-methylethyl)benzene, bis(isocyanatobutyl) benzene, bis(isocyanatomethyl)naphthalene, bis(isocyanatomethyl)diphenyl ether, bis(isocyanatoethyl) phthalate, mesitylene triisocyanate and 2,5-di(isocyanatomethyl)furan. Aromatic polyisocyanates having isocyanate groups bonded directly to the aromatic ring can include but are not limited to phenylene diisocyanate, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, naphthalene diisocyanate, methylnaphthalene diisocyanate, biphenyl diisocyanate, ortho-toluidine diisocyanate, ortho-tolylidine diisocyanate, ortho-tolylene diisocyanate, 4,4'-diphenylmethane diisocyanate, bis(3-methyl-4-isocyanatophenyl)methane, bis(isocyanatophenyl)ethylene, 3,3'-dimethoxy-biphenyl-4,4'-diisocyanate, triphenylmethane triisocyanate, polymeric 4,4'-diphenylmethane diisocyanate, naphthalene triisocyanate, diphenylmethane-2,4,4'-triisocyanate, 4-methyldiphenylmethane-3,5,2',4',6'-pentaisocyanate, diphenylether diisocyanate, bis(isocyanatophenylether)ethyleneglycol, bis(isocyanatophenylether)-1,3-propyleneglycol, benzophenone diisocyanate, carbazole diisocyanate, ethylcarbazole diisocyanate and dichlorocarbazole diisocyanate.

Any suitable aliphatic, cycloaliphatic, or aromatic alkyl monoalcohol or phenolic compound may be used as a capping agent for the polyisocyanate including, for example, lower aliphatic alcohols such as methanol, ethanol, and n-butanol; allylic alcohols; cycloaliphatic alcohols such as cyclohexanol; benzylic alcohols, aromatic-alkyl alcohols such as phenyl carbinol and methylphenyl carbinol; and phenolic compounds such as phenol itself and substituted phenols wherein the substituents do not affect coating operations, such as cresol and nitrophenol. Glycol ethers may also be used as capping agents. Suitable glycol ethers include ethylene glycol butyl ether, diethylene glycol butyl ether, ethylene glycol methyl ether and propylene glycol methyl ether.

Other suitable capping agents include oximes such as methyl ethyl ketoxime, acetone oxime and cyclohexanone oxime, lactams such as epsilon-caprolactam, and dialkylamines such as dibutyl amine.

By "partially capped" is meant that at least one isocyanate functional group on the polyisocyanate is capped and at least one free isocyanate functional group is present on the polyisocyanate for reaction with active hydrogen groups.

In a particular embodiment, the polyisocyanate is toluene diisocyanate partially capped with 2-ethylhexanol.

The partially capped polyisocyanate is typically present in the film-forming composition of the present invention in an amount of 10 to 50 percent, often 25 to 45 percent by weight, based on the total weight of resin solids in the film-forming composition.

The ethylenically unsaturated monomer (b) has active hydrogen functional groups capable of reacting with isocyanate groups, such as amino and hydroxyl functional groups. Useful amino functional monomers include aminoalkyl acrylates and methacrylates. Useful hydroxyl functional monomers include hydroxyalkyl acrylates and methacrylates, typically having 2 to 4 carbon atoms in the hydroxyalkyl group, such as hydroxyethyl acrylate, hydroxypropyl acrylate, 4-hydroxybutyl acrylate, hydroxy functional adducts of caprolactone and hydroxyalkyl acrylates, and corresponding methacrylates, as well as beta-hydroxy ester functional monomers. Beta-hydroxy ester functional monomers can be prepared from ethylenically unsaturated, epoxy functional monomers and carboxylic acids having from about 13 to about 20 carbon atoms, or from ethylenically unsaturated acid functional monomers and epoxy compounds containing at least 5 carbon atoms which are not polymerizable with the ethylenically unsaturated acid functional monomer.

Other ethylenically unsaturated monomers may be added to the radiation-curable diluent to polymerize with the active hydrogen functional monomers via addition polymerization upon exposure to actinic radiation. Suitable acrylic polymers include copolymers of one or more alkyl esters of acrylic acid or methacrylic acid, optionally together with one or more other polymerizable ethylenically unsaturated monomers. Useful alkyl esters of acrylic acid or methacrylic acid include aliphatic alkyl esters containing from 1 to 30, and preferably 4 to 18 carbon atoms in the alkyl group. Non-limiting examples include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

The reaction product is prepared by reacting the partially capped polyisocyanate (a) with the active hydrogen functional groups on the ethylenically unsaturated monomer, typically in the presence of a catalyst. Suitable catalysts include tin compounds such as triphenyl tin hydroxide, butyl stannoic acid, dioctyltin oxide, dibutyltin dilaurate, dibutyltin diacetate, and dibutyltin oxide.

Optional additives such as surfactants, wetting agents or catalysts can be included in the film-forming composition of the present invention. Catalysts include those effective for reactions of isocyanates with active hydrogens. The catalysts, which are often solids, are typically dispersed in a conventional pigment grinding vehicle such as those disclosed in U.S. Pat. No. 4,007,154, by a grinding or milling process. As such, they may be added to the composition as a separate component or they may be part of either component (1) or (2). The catalysts are typically used in amounts of about 0.05 to 2 percent by weight metal based on weight of total solids. Suitable catalysts include tin compounds such as triphenyl tin hydroxide, butyl stannoic acid, dioctyltin oxide, dibutyltin dilaurate, dibutyltin diacetate, and dibutyltin oxide. Such catalysts may aid in the reaction of the capped polyisocyanate groups in the reaction product (upon deblocking) with active hydrogen groups present in the film-forming composition itself or in any subsequently applied coatings, such as the electrodepositable composition described below.

The film-forming compositions of the present invention are suitable for use in processes for improving the corrosion resistance of metal substrates. The metal substrates used in the process of the present invention may include ferrous metals, non-ferrous metals and combinations thereof. Suitable ferrous metals include iron, steel, and alloys thereof. Non-limiting examples of useful steel materials include cold rolled steel, pickled steel, steel surface-treated with any of zinc metal, zinc compounds and zinc alloys (including electrogalvanized steel, hot-dipped galvanized steel, GALVANNEAL steel, and steel plated with zinc alloy,) and/or zinc-iron alloys. Also, aluminum, aluminum alloys, zinc-aluminum alloys such as GALFAN, GALVALUME, aluminum plated steel and aluminum alloy plated steel substrates may be used. Steel substrates (such as cold rolled steel or any of the steel substrates listed above) coated with a weldable, zinc-rich or iron phosphide-rich organic coating are also suitable for use in the process of the present invention. Such weldable coating compositions are disclosed in U.S. Pat. Nos. 4,157,924 and 4,186,036. Cold rolled steel may be, but is not necessarily, pretreated with an appropriate solution known in the art, such as a metal phosphate solution, an aqueous solution containing at least one Group IIIB or IVB metal, an organophosphate solution, an organophosphonate solution, and combinations thereof, as discussed below.

The substrate may alternatively comprise more than one metal or metal alloy in that the substrate may be a combination of two or more metal substrates assembled together such as hot-dipped galvanized steel assembled with aluminum substrates.

The substrates to be used may be bare metal substrates. By "bare" is meant a virgin metal substrate that has not been treated with any pretreatment compositions such as conventional phosphating baths, heavy metal rinses, etc. Additionally, bare metal substrates being treated in the process of the present invention may be a cut edge of a substrate that is otherwise treated and/or coated over the rest of its surface. Alternatively, the substrates may undergo one or more treatment steps known in the art prior to the application of the film-forming composition.

The film-forming compositions of the present invention are particularly suitable for use in a process for improving corrosion resistance of vulnerable metals, such as untreated and uncleaned cold rolled steel. Untreated metals tend to have an oily surface resulting from coil manufacturing and conventional coating compositions do not adhere well to the oily surfaces. The compositions of the present invention do not have such drawbacks. For example, in the manufacture of an automobile, the compositions of the present invention may be applied to oily steel in an OEM body shop during construction of a body in white.

The process of the present invention comprises (a) applying to the substrate the film-forming composition described above. The film-forming compositions can be applied by conventional means including but not limited to brushing, rolling, dipping, flow coating, spraying and the like. They are most often applied by spraying. The usual spray techniques and equipment for air spraying, airless spraying, and electrostatic spraying employing manual and/or automatic methods can be used. The entire substrate surface may be coated, or only a portion thereof. Small areas or portions may be coated as necessary to protect the areas of the metal surface that are likely to be missed by adhesives or other coatings being applied during manufacture of a vehicle or other item. In a hem and flange assembly on an automobile, for example, the composition may be applied to the inside of the lower edge of the sheet to be folded up as a hem, and to both opposing lower edges of the sheet to be inserted into the hem as a flange.

After application of the film-forming composition to the substrate, the substrate is (b) exposed to actinic radiation to effect polymerization of the ethylenically unsaturated functional groups present in the radiation-curable diluent and at least partially cure the ethylenically unsaturated groups.

"Actinic radiation" is light with wavelengths of electromagnetic radiation ranging from the ultraviolet ("UV") light range, through the visible light range, and into the infrared range. Actinic radiation which can be used to cure coating compositions of the present invention generally has wavelengths of electromagnetic radiation ranging from 150 to 2,000 nanometers (nm), can range from 180 to 1,000 nm, and also can range from 200 to 500 nm. Examples of suitable ultraviolet light sources include mercury arcs, carbon arcs, low, medium or high pressure mercury lamps, swirl-flow plasma arcs and ultraviolet light emitting diodes. Preferred ultraviolet light-emitting lamps are medium pressure mercury vapor lamps having outputs ranging from 200 to 600 watts per inch (79 to 237 watts per centimeter) across the length of the lamp tube. Generally, a 1 mil (25 micrometers) thick wet film of a coating composition according to the present invention can be cured through its thickness to a tack-free state upon exposure to actinic radiation by passing the film at a rate of 20 to 1000 feet per minute (6 to 300 meters per minute) under four medium pressure mercury vapor lamps of exposure at 200 to 1000 millijoules per square centimeter of the wet film.

After polymerization of the ethylenically unsaturated groups to at least a "B" stage' i. e., at least partially cured to a stage wherein the coated substrate is tack free and can be subjected to a bend without adhesive failure, a curable, electrodepositable coating composition is electrophoretically deposited onto the substrate in step (c). It is noted that the components of the film-forming composition are sufficiently similar chemically to those in the electrodepositable coating composition to enhance compatibility and adhesion between the two layers upon application of the electrodepositable coating composition to the film-forming composition on the substrate. Moreover, free reactive functional groups in the film-forming composition may react with groups in the subsequently applied electrodepositable coating composition upon heating as described below.

The electrodepositable composition comprises: a resin component (1) containing an active hydrogen-containing, cationic salt group-containing resin that is electrodepositable on a cathode. The active hydrogen-containing, cationic salt group-containing resin may be prepared from an acrylic, polyester, polyurethane and/or polyepoxide polymer.

Suitable acrylic polymers that may be used as the active hydrogen-containing, cationic salt group-containing resin include copolymers of one or more alkyl esters of acrylic acid or methacrylic acid optionally together with one or more other polymerizable ethylenically unsaturated monomers. Suitable alkyl esters of acrylic acid or methacrylic acid include methyl methacrylate, ethyl methacrylate, butyl methacrylate, ethyl acrylate, butyl acrylate, and 2-ethyl hexyl acrylate. Suitable other copolymerizable ethylenically unsaturated monomers include nitriles such acrylonitrile and methacrylonitrile, vinyl and vinylidene halides such as vinyl chloride and vinylidene fluoride and vinyl esters such as vinyl acetate. Acid and anhydride functional ethylenically unsaturated monomers such as acrylic acid, methacrylic acid or anhydride, itaconic acid, maleic acid or anhydride, or fumaric acid may be used. Amide functional monomers including, acrylamide, methacrylamide, and N-alkyl substituted (meth)acrylamides are also suitable. Vinyl aromatic compounds such as styrene and vinyl toluene are also suitable.

Functional groups such as hydroxyl and amino groups may be incorporated into the acrylic polymer by using functional monomers such as hydroxyalkyl acrylates and methacrylates or aminoalkyl acrylates and methacrylates. Tertiary amino groups (for conversion to cationic salt groups) may be incorporated into the acrylic polymer by using dialkylaminoalkyl (meth)acrylate functional monomers such as dimethylaminoethyl methacrylate, diethylaminoethyl methacrylate, dipropylaminoethyl methacrylate, and the like.

Epoxide functional groups (for conversion to cationic salt groups) may be incorporated into the acrylic polymer by using functional monomers such as glycidyl acrylate and methacrylate, 3,4-epoxycyclohexylmethyl(meth)acrylate, 2-(3,4-epoxycyclohexyl)ethyl(meth)acrylate, or allyl glycidyl ether. Alternatively, epoxide functional groups may be incorporated into the acrylic polymer by reacting hydroxyl groups on the acrylic polymer with an epihalohydrin or dihalohydrin such as epichlorohydrin or dichlorohydrin in the presence of alkali.

The acrylic polymer may be prepared by traditional free radical initiated polymerization techniques, such as solution or emulsion polymerization, as known in the art using suitable catalysts which include organic peroxides and azo type compounds and optionally chain transfer agents such as alpha-methyl styrene dimer and tertiary dodecyl mercaptan.

Besides acrylic polymers, the active hydrogen-containing, cationic salt group-containing resin may be a polyester. The polyesters may be prepared in a known manner by condensation of polyhydric alcohols and polycarboxylic acids. Suitable polyhydric alcohols include, for example, ethylene glycol, propylene glycol, butylene glycol, 1,6-hexylene glycol, neopentyl glycol, diethylene glycol, glycerol, trimethylol propane, and pentaerythritol.

Examples of suitable polycarboxylic acids used to prepare the polyester include succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used.

The polyesters contain a portion of free hydroxyl groups (done by using excess polyhydric alcohol and/or higher polyols during preparation of the polyester) which are available for crosslinking reactions.

Epoxide functional groups may be incorporated into the polyester by reacting hydroxyl groups on the polyester with an epihalohydrin or dihalohydrin such as epichlorohydrin or dichlorohydrin in the presence of alkali.

Alkanolamines and dialkanolamines may be used in combination with the polyols in the preparation of the polyester, and the amine groups later alkylated to form tertiary amino groups for conversion to cationic salt groups. Likewise, tertiary amines such as N,N-dialkylalkanolamines and N-alkyldialkanolamines may be used in the preparation of the polyester. Examples of suitable tertiary amines include those N-alkyl dialkanolamines disclosed in U.S. Pat. No. 5,483,012, at column 3, lines 49-63. Suitable polyesters for use in the process of the present invention include those disclosed in U.S. Pat. No. 3,928,157.

Polyurethanes can also be used as the active hydrogen-containing, cationic salt group-containing resin. Among the polyurethanes which can be used are polymeric polyols which are prepared by reacting polyester polyols or acrylic polyols such as those mentioned above with a polyisocyanate such that the OH/NCO equivalent ratio is greater than 1:1 so that free hydroxyl groups are present in the product. Smaller polyhydric alcohols such as those disclosed above for use in the preparation of the polyester may also be used in place of or in combination with the polymeric polyols.

The organic polyisocyanate used to prepare the polyurethane polymer is often an aliphatic polyisocyanate. Diisocyanates and/or higher polyisocyanates are suitable.

Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed. Examples include isophorone diisocyanate and 4,4'-methylene-bis-(cyclohexyl isocyanate). Examples of suitable aralkyl diisocyanates are meta-xylylene diisocyanate and $\alpha,\alpha,\alpha',\alpha'$-tetramethylmeta-xylylene diisocyanate.

Isocyanate prepolymers, for example, reaction products of polyisocyanates with polyols such as neopentyl glycol and trimethylol propane or with polymeric polyols such as polycaprolactone diols and triols (NCO/OH equivalent ratio greater than one) can also be used in the preparation of the polyurethane.

Hydroxyl functional tertiary amines such as N,N-dialkylalkanolamines and N-alkyl dialkanolamines may be used in combination with the other polyols in the preparation of the polyurethane. Examples of suitable tertiary amines include those N-alkyl dialkanolamines disclosed in U.S. Pat. No. 5,483,012, at column 3, lines 49-63.

Epoxide functional groups may be incorporated into the polyurethane by reacting hydroxyl groups on the polyurethane with an epihalohydrin or dihalohydrin such as epichlorohydrin or dichlorohydrin in the presence of alkali.

Suitable polyepoxides polymers for use as the active hydrogen-containing, cationic salt group-containing resin include, for example, a polyepoxide chain-extended by reacting together a polyepoxide and a polyhydroxyl group-containing material such as alcoholic hydroxyl group-containing materials and phenolic hydroxyl group-containing materials to chain extend or build the molecular weight of the polyepoxide.

A chain-extended polyepoxide is typically prepared by reacting together the polyepoxide and polyhydroxyl group-containing material neat or in the presence of an inert organic solvent such as a ketone, including methyl isobutyl ketone and methyl amyl ketone, aromatics such as toluene and xylene, and glycol ethers such as the dimethyl ether of diethylene glycol. The reaction is usually conducted at a temperature of about 80° C. to 160° C. for about 30 to 180 minutes until an epoxy group-containing resinous reaction product is obtained.

The equivalent ratio of reactants; i. e., epoxy:polyhydroxyl group-containing material is typically from about 1.00:0.75 to 1.00:2.00.

In general the epoxide equivalent weight of the polyepoxide will range from 100 to about 2000, typically from about 180 to 500. The epoxy compounds may be saturated or unsaturated, cyclic or acyclic, aliphatic, alicyclic, aromatic or heterocyclic. They may contain substituents such as halogen, hydroxyl, and ether groups.

Examples of polyepoxides are those having a 1,2-epoxy equivalency greater than one and usually about two; that is, polyepoxides which have on average two epoxide groups per molecule. The most commonly used polyepoxides are polyglycidyl ethers of cyclic polyols, for example, polyglycidyl ethers of polyhydric phenols such as Bisphenol A, resorcinol, hydroquinone, benzenedimethanol, phloroglucinol, and catechol; or polyglycidyl ethers of polyhydric alcohols such as alicyclic polyols, particularly cycloaliphatic polyols such as 1,2-cyclohexane diol, 1,4-cyclohexane diol, 2,2-bis(4-hydroxycyclohexyl)propane, 1,1-bis(4-hydroxycyclohexyl)ethane, 2-methyl-1,1-bis(4-hydroxycyclohexyl) propane, 2,2-bis(4-hydroxy-3-tertiarybutylcyclohexyl)propane, 1,3-bis(hydroxymethyl)cyclohexane and 1,2-bis (hydroxymethyl)cyclohexane. Examples of aliphatic polyols include, inter alia, trimethylpentanediol and neopentyl glycol.

Polyhydroxyl group-containing materials used to chain extend or increase the molecular weight of the polyepoxide may additionally be polymeric polyols such as those disclosed above.

The polyepoxides may alternatively be acrylic polymers prepared with epoxy functional monomers such as glycidyl acrylate, glycidyl methacrylate, allyl glycidyl ether, and methallyl glycidyl ether. Polyesters, polyurethanes, or polyamides prepared with glycidyl alcohols or glycidyl amines, or reacted with an epihalohydrin are also suitable epoxy functional resins.

The resins used in the electrodepositable composition typically have number average molecular weights ranging from about 180 to 500, often from about 186 to 350.

The resin used in the electrodepositable composition contains cationic salt groups. The cationic salt groups may be incorporated into the resin by any means know in the art depending on the type of resin and/or active hydrogen group, such as by acidifying tertiary amine groups in the resin as described below or by reacting epoxide groups in the resin with a cationic salt group former. By "cationic salt group former" is meant a material which is reactive with epoxy groups and which can be acidified before, during, or after reaction with epoxy groups to form cationic salt groups. Examples of suitable materials include amines such as primary or secondary amines which can be acidified after reaction with the epoxy groups to form amine salt groups, or tertiary amines which can be acidified prior to reaction with the epoxy groups and which after reaction with the epoxy groups form quaternary ammonium salt groups. Examples of other cationic salt group formers are sulfides that can be mixed with acid prior to reaction with the epoxy groups and form ternary sulfonium salt groups upon subsequent reaction with the epoxy groups.

When amines are used as the cationic salt formers, monoamines are often used, and hydroxyl-containing amines are particularly suitable. Polyamines may be used but are not recommended because of a tendency to gel the resin.

In a typical embodiment of the invention, the cationic salt group-containing resin contains amine salt groups, which are derived from an amine containing a nitrogen atom to which is bonded at least one, usually two, alkyl groups having a hetero atom in a beta-position relative to the nitrogen atom. A hetero atom is a non-carbon or non-hydrogen atom, typically oxygen, nitrogen, or sulfur.

Hydroxyl-containing amines, when used as the cationic salt group formers, may impart the resin with amine groups comprising a nitrogen atom to which is bonded at least one alkyl group having a hetero atom in a beta-position relative to the nitrogen atom. Examples of hydroxyl-containing amines are alkanolamines, dialkanolamines, alkyl alkanolamines, and aralkyl alkanolamines containing from 1 to 18 carbon atoms, usually 1 to 6 carbon atoms in each of the alkanol, alkyl and aryl groups. Specific examples include ethanolamine, N-methylethanolamine, diethanolamine, N-phenylethanolamine, N,N-dimethylethanolamine, N-methyldiethanolamine, triethanolamine and N-(2-hydroxyethyl)-piperazine.

Minor amounts of amines such as mono, di, and trialkylamines and mixed aryl-alkyl amines which do not contain hydroxyl groups, or amines substituted with groups other than hydroxyl which do not negatively affect the reaction between the amine and the epoxy may also be used, but their use is not preferred. Specific examples include ethylamine, methylethylamine, triethylamine, N-benzyldimethylamine, dicocoamine and N,N-dimethylcyclohexylamine.

The reaction of a primary and/or secondary amine with epoxide groups on the polymer takes place upon mixing of the amine and polymer. The amine may be added to the polymer or vice versa. The reaction can be conducted neat or in the presence of a suitable solvent such as methyl isobutyl ketone, xylene, or 1-methoxy-2-propanol. The reaction is generally exothermic and cooling may be desired. However, heating to a moderate temperature of about 50 to 150° C. may be done to hasten the reaction.

The tertiary amine functional polymer (or the reaction product of the primary and/or secondary amine and the epoxide functional polymer) is rendered cationic and water dispersible by at least partial neutralization with an acid. Suitable acids include organic and inorganic acids such as formic acid, acetic acid, lactic acid, phosphoric acid, dimethylolpropionic acid, and sulfamic acid. Lactic acid is used most often. The extent of neutralization varies with the particular reaction product involved. However, sufficient acid should be used to disperse the electrodepositable composition in water. Typically, the amount of acid used provides at least 20 percent of all of the total neutralization. Excess acid may also be used beyond the amount required for 100 percent total neutralization.

In the reaction of a tertiary amine with an epoxide functional polymer, the tertiary amine can be pre-reacted with the neutralizing acid to form the amine salt and then the amine salt reacted with the polymer to form a quaternary salt group-containing resin. The reaction is conducted by mixing the amine salt with the polymer in water. Typically the water is present in an amount ranging from about 1.75 to about 20 percent by weight based on total reaction mixture solids.

In forming the quaternary ammonium salt group-containing resin, the reaction temperature can be varied from the lowest temperature at which the reaction will proceed, generally at or slightly above room temperature, to a maximum temperature of about 100° C. (at atmospheric pressure). At higher pressures, higher reaction temperatures may be used. Usually the reaction temperature is in the range of about 60 to 100° C. Solvents such as a sterically hindered ester, ether, or sterically hindered ketone may be used, but their use is not necessary.

In addition to the primary, secondary, and tertiary amines disclosed above, a portion of the amine that is reacted with the polymer can be a ketimine of a polyamine, such as is described in U.S. Pat. No. 4,104,147, column 6, line 23 to column 7, line 23. The ketimine groups decompose upon dispersing the amine-epoxy reaction product in water.

In addition to resins containing amine salts and quaternary ammonium salt groups, cationic resins containing ternary sulfonium groups may be used in forming the cationic salt group-containing resin. Examples of these resins and their method of preparation are described in U.S. Pat. No. 3,793,278 to DeBona and U.S. Pat. No. 3,959,106 to Bosso et al., incorporated herein by reference.

The extent of cationic salt group formation should be such that when the resin is mixed with an aqueous medium and the other ingredients, a stable dispersion of the electrodepositable composition will form. By "stable dispersion" is meant one that does not settle or is easily redispersible if some settling occurs. Moreover, the dispersion should be of sufficient cationic character that the dispersed particles will migrate toward and electrodeposit on a cathode when an electrical potential is set up between an anode and a cathode immersed in the aqueous dispersion.

Generally, the cationic resin is non-gelled and contains from about 0.1 to 3.0, often from about 0.1 to 0.7 millequivalents of cationic salt group per gram of resin solids. By "non-gelled" is meant that the resin is substantially free from crosslinking, and prior to cationic salt group formation, the resin has a measurable intrinsic viscosity when dissolved in a suitable solvent. In contrast, a gelled resin, having an essentially infinite molecular weight, would have an intrinsic viscosity too high to measure.

The active hydrogens associated with the cationic resin include any active hydrogens which are reactive with isocyanates within the temperature range of about 93 to 204° C., usually about 121 to 177° C. Typically, the active hydrogens comprise hydroxyl and primary and secondary amino, including mixed groups such as hydroxyl and primary amino. Typically, the resin will have an active hydrogen content of about 1.7 to 10 millequivalents, more often about 2.0 to 5 millequivalents of active hydrogen per gram of resin solids.

The cationic salt group-containing resin is typically present in the electrodepositable composition in an amount of 50 to 90 percent, often 55 to 75 percent by weight, based on the total weight of the cationic salt group-containing resin and the curing agent.

The polyisocyanate curing agent (2) used in the electrodepositable composition is at least partially capped. Often the polyisocyanate curing agent is a fully capped polyisocyanate with substantially no free isocyanate groups. The polyisocyanate can be an aliphatic or an aromatic polyisocyanate or a mixture of the two. Diisocyanates are used most often, although higher polyisocyanates can be used in place of or in combination with diisocyanates.

Examples of polyisocyanates suitable for use as curing agents include all those disclosed above as suitable for use in the preparation of the polyurethane. In a particular embodiment, the polyisocyanate is isophorone diisocyanate capped with trimethylol propane and/or methyl ethyl ketoxime.

Any suitable aliphatic, cycloaliphatic, or aromatic alkyl monoalcohol or phenolic compound may be used as a capping agent for the polyisocyanate including, for example, lower aliphatic alcohols such as methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols wherein the substituents do not affect coating operations, such as cresol and nitrophenol. Glycol ethers may also be used as capping agents. Suitable glycol ethers include ethylene glycol butyl ether, diethylene glycol butyl ether, ethylene glycol methyl ether and propylene glycol methyl ether.

Other suitable capping agents include oximes such as methyl ethyl ketoxime, acetone oxime and cyclohexanone oxime, lactams such as epsilon-caprolactam, and amines such as dibutyl amine.

The polyisocyanate curing agent (2) is typically present in the electrodepositable composition in an amount of 10 to 50 percent, often 25 to 45 percent by weight, based on the total weight of the cationic salt group-containing resin and the curing agent.

The curable, electrodepositable coating composition may additionally include optional ingredients commonly used in such compositions. For example, the composition may further comprise a hindered amine light stabilizer for UV degradation resistance. Such hindered amine light stabilizers include those disclosed in U.S. Pat. No. 5,260,135. When they are used they are present in the electrodepositable composition in an amount of 0.1 to 2 percent by weight, based on the total weight of resin solids in the electrodepositable composition. Other optional additives such as surfactants, wetting agents or catalysts can be included in the composition.

Catalysts include those effective for reactions of isocyanates with active hydrogens, such as any of those mentioned above.

The electrodepositable compositions are typically prepared as electrodeposition baths, diluted with water. The composition used as an electrodeposition bath in the process of the present invention has a resin solids content usually within the range of about 5 to 30 percent by weight, often 10 to 30 percent by weight or 5 to 25 percent by weight based on total weight of the electrodeposition bath.

Besides water, the aqueous medium of the electrodeposition bath may contain a coalescing solvent. Useful coalescing solvents include hydrocarbons, alcohols, esters, ethers and ketones. The most commonly used coalescing solvents include alcohols, polyols and ketones. Specific coalescing solvents include isopropanol, butanol, 2-ethylhexanol, isophorone, 2-methoxypentanone, ethylene and propylene glycol and the monoethyl, monobutyl and monohexyl ethers of ethylene glycol. The amount of coalescing solvent is generally between about 0.01 and 25 percent and when used, often from about 0.05 to about 5 percent by weight based on total weight of the aqueous medium.

The curable, electrodepositable coating composition may be prepared using the following process:

(1) combining (i) the resin component as described above containing one or more of the active hydrogen-containing, cationic salt group-containing resins described earlier with (ii) an at least partially capped polyisocyanate curing agent to form a reactive mixture;

(2) adding a catalyst composition to the reactive mixture; and (3) diluting the reactive mixture with water to a solids content of 10 to 30 percent by weight, based on the total weight of the reactive mixture.

In certain embodiments of the present invention, after diluting the reactive mixture with water to a solids content of up to 30 percent by weight, a portion (usually twenty percent by weight) of the reactive mixture may be removed by ultrafiltration and replaced with deionized water.

Before any treatment or electrodeposition, the substrate may optionally be formed into an object of manufacture before or after radiation cure of the diluent, often after cure to a "B" stage. As mentioned above, a combination of more than one metal substrate may be assembled together to form an object.

The substrate may optionally be cleaned using conventional cleaning procedures and materials. These would include mild or strong alkaline cleaners such as are commercially available and conventionally used in metal pretreatment processes. Examples of alkaline cleaners include CHEMKLEEN 163 and CHEMKLEEN 177, both of which are available from PPG Industries, Pretreatment and Specialty Products. Such cleaners are generally followed and/or preceded by a water rinse. The metal surface may also be rinsed with an aqueous acidic solution after or in place of cleaning with the alkaline cleaner. Examples of rinse solutions include mild or strong acidic cleaners such as the dilute nitric acid solutions commercially available and conventionally used in metal pretreatment processes. Rinse solutions containing heavy metals such as chromium are not suitable for use in the process of the present invention.

The metal substrate may optionally be pretreated with any suitable solution known in the art, such as a metal phosphate solution, an aqueous solution containing at least one Group IIIB or IVB metal, an organophosphate solution, an organophosphonate solution, and combinations thereof. The pretreatment solutions may be substantially free of environmentally detrimental heavy metals such as chromium and nickel. Suitable phosphate conversion coating compositions may be any of those known in the art that are free of heavy metals. Examples include zinc phosphate, which is used most often, iron phosphate, manganese phosphate, calcium phosphate, magnesium phosphate, cobalt phosphate, zinc-iron phosphate, zinc-manganese phosphate, zinc-calcium phosphate, and layers of other types, which may contain one or more multivalent cations. Phosphating compositions are known to those skilled in the art and are described in U.S. Pat. Nos. 4,941,930, 5,238,506, and 5,653,790.

The IIIB or IVB transition metals and rare earth metals referred to herein are those elements included in such groups in the CAS Periodic Table of the Elements as is shown, for example, in the *Handbook of Chemistry and Physics,* 63rd Edition (1983).

Typical group IIIB and IVB transition metal compounds and rare earth metal compounds are compounds of zirconium, titanium, hafnium, yttrium and cerium and mixtures thereof. Typical zirconium compounds may be selected from hexafluorozirconic acid, alkali metal and ammonium salts thereof, ammonium zirconium carbonate, zirconyl nitrate, zirconium carboxylates and zirconium hydroxy carboxylates such as hydrofluorozirconic acid, zirconium acetate, zirconium oxalate, ammonium zirconium glycolate, ammonium zirconium lactate, ammonium zirconium citrate, and mixtures thereof. Hexafluorozirconic acid is used most often. An example of a titanium compound is fluorotitanic acid and its salts. An example of a hafnium compound is hafnium nitrate. An example of a yttrium compound is yttrium nitrate. An example of a cerium compound is cerous nitrate.

Typical compositions to be used in the pretreatment step include non-conductive organophosphate and organophosphonate pretreatment compositions such as those disclosed in U.S. Pat. Nos. 5,294,265 and 5,306,526. Such organophosphate or organophosphonate pretreatments are available commercially from PPG Industries, Inc. under the name NUPAL®.

Following the optional pretreatment step, the metal substrate may be rinsed with water and then electrocoated. Rinsing ensures that the layer of the non-conductive coating is sufficiently thin to be non-insulating. Electrocoating may be done immediately or after a drying period at ambient or elevated temperature conditions.

In the process of electrodeposition, the metal substrate being coated, serving as an electrode, and an electrically conductive counter electrode are placed in contact with an ionic, electrodepositable composition. Upon passage of an electric current between the electrode and counter electrode while they are in contact with the electrodepositable composition, an adherent film of the electrodepositable composition will deposit in a substantially continuous manner on the metal substrate. In the process of the present invention the metal substrate being coated serves as a cathode, and the electrodepositable composition is cationic.

Electrodeposition is usually carried out at a constant voltage in the range of from about 1 volt to several thousand volts, typically between 50 and 500 volts. Current density is usually between about 1.0 ampere and 15 amperes per square foot (10.8 to 161.5 amperes per square meter) and tends to decrease quickly during the electrodeposition process, indicating formation of a continuous self-insulating film.

After electrodeposition, the coated substrate is heated to cure the deposited compositions. The heating or curing operation is usually carried out at a temperature in the range of from 250 to 450° F. (121.1 to 232.2° C.), often 300 to 450° F. (148.9 to 232.2° C.), more often 300 to 400° F. (148.9 to 204.4° C.) for a period of time sufficient to effect cure of the composition, typically ranging from 10 to 60 minutes. The thickness of the resultant film is usually from about 10 to 50 microns. By "cure" is meant a chemical reaction between the active hydrogen-containing, cationic salt group-containing resin and the polyisocyanate curing agent resulting in a substantially crosslinked film.

As noted above, the components of the film-forming composition capable of undergoing dual cure have chemical structures and functional groups very similar to those in the subsequently applied electrodepositable composition, making the compositions very compatible and even capable of chemically reacting with each other. As such, the compositions tend to coalesce and mix well, resulting in very few gaps or bare spots on the coated substrate.

One or more pigmented color coating compositions and/or transparent coating compositions may be applied directly to the electrodepositable composition after curing of the electrodepositable composition. The use of a primer or primer-surfacer may be unnecessary because of the superior corrosion resistance and UV degradation resistance afforded by the various compositions used in the process of the present invention. Suitable top coats (base coats, clear coats, pigmented monocoats, and color-plus-clear composite compositions) include any of those known in the art, and each may be waterborne, solventborne or powdered. The top coat typically includes a film-forming resin, crosslinking material and pigment (in a colored base coat or monocoat). Non-limiting examples of suitable base coat compositions include waterborne base coats such as are disclosed in U.S. Pat. Nos. 4,403,003; 4,147,679; and 5,071,904. Suitable clear coat compositions include those disclosed in U.S. Pat. Nos. 4,650,718; 5,814,410; 5,891,981; and WO 98/14379.

Metal substrates coated by the process of the present invention may demonstrate excellent corrosion resistance as determined by salt spray corrosion resistance testing.

The invention will be further described and certain embodiments illustrated in the following non-limiting examples.

Example 1

An aromatic urethane mono-acrylate was prepared as follows:

257.3 g of toluene diisocyanate half blocked with 2-ethylhexanol, dissolved in MIBK at 95% solids, were weighed into a pint jar. 85.6 grams of hydroxy ethyl acrylate and 0.68 grams of dibutyltindilaurate were added and the combined mixture agitated until uniform. The reaction mixture began to exotherm after several minutes and became warm to touch and was placed into a bath of cool water. Following this initial exotherm and cooling cycle, the jar was placed in a 165° F. (76° C.) oven for 75 minutes to drive the reaction to completion.

Example 2

A solution of Bisphenol-A was prepared in acrylate diluent as follows:

41 grams of Bisphenol-A flake was weighed into an 8 oz. jar. 82 grams of tetrahydrofurfuryl methacrylate (M-151 available from Miwon Specialty Chemical Co.) was added and the jar placed in a 100° C. oven. The mixture was removed several times and shaken over a period of 2 hours after which a clear solution was obtained.

Example 3

A solution of EPON 1001 was prepared in a phenol acrylate diluent as follows:

60 grams of EPON 1001 available from Dow Chemical Corporation was weighed into an 8 oz. jar. 40 grams of phenol acrylate (M-140 available from Miwon Specialty Chemical Co.) was added and the jar placed in a 160° F. hot room. In less than one day with occasional shaking the epoxy flakes dissolved to yield a clear, uniform solution.

Example 4

A cationic epoxy backbone polymer was prepared in solvent as follows:

| | Ingredients | Parts by weight |
|---|---|---|
| A | Butyl CARBITOL formal[1] | 133.6 |
| | EPON 880 | 614.7 |
| | Bisphenol A | 265.8 |
| | Methyl isobutyl ketone | 10 |
| B | Ethyl triphenyl phosphonium iodide | 0.6 |
| C | Methyl isobutyl ketone | 70 |
| D | Diethanol amine | 54.6 |
| | Bishexamethylenetriamine/Propylenecarbonate adduct[2] in methyl isobutyl ketone | 24.4 |
| | Ketimine[3] | 89.9 |
| E | Butoxy ethanol | 315.9 |
| | Butyl CARBITOL formal | 182.3 |

[1]Reaction product of butoxy ethoxy ethanol and paraformaldehyde, available from PPG Industries Inc.
[2]Reaction product of bishexamethylenetriamine with propylene carbonate and the product diluted with methyl isobutyl ketone (80% solids)
[3]Ketimine is obtained by reacting diethylenetriamine with methyl isobutyl ketone (72% solids)

Charge A was introduced to the reactor followed by B. The mixture was heated to 125° C. and allowed to exotherm to 170° C. The mixture was then cooled to 160° C. and held at that temperature for 1 hour. Solvent C then was added. The reaction was cooled to 110° C. followed by addition of the mixture of amines as charge D. The mixture exothermed to 125° C. The mixture was then held at that temperature for 1 hour followed by the addition of butoxy ethanol and butoxy ethoxy ethanol.

Example 5

This example illustrates the preparation of dibutyltinoxide paste.

138.9 grams of a cationic grind vehicle prepared in accordance with Example C in U.S. Pat. No. 4,933,056, 18.6 grams of ethyleneglycol monobutyl ether (butyl CELLOSOLVE) and 170 grams of M-151 acrylate diluent were weighed into a quart-size stainless steel vessel. 150 grams of dibutyltinoxide ("DBTO" available from PMC Organometallix Inc.) and 1000 grams of zircoa grinding media (1-2 mm diameter) were added under the agitation of a toothless disc at 1725 rpm. After 20 minutes an additional 11 grams of M-151 was added and the agitation continued for another 2 hours and 40 minutes for a total "grind time" of three hours. The resulting pigment paste had a calculated level of DBTO of 30.7%, a calculated level of M-151 as 1.2 times the amount of DBTO, and a calculated level of butyl CELLOSOLVE as 0.55 times the amount of DBTO.

Example 6

The following materials were weighed into a sealable glass container and mixed until uniform. The container was stored in a 160° F. hot room for ½ hour which improved its clarity to the point of translucence.

| Material | weight, g | % solids | g solids | % of formula solids |
|---|---|---|---|---|
| Urethane mono-acrylate of Example 1 | 54.0 | 96.2 | 51.9 | 37.3 |
| EPON 828 Bisphenol-A diglycidyl ether | 13.1 | 100 | 13.1 | 9.40 |

-continued

| Material | weight, g | % solids | g solids | % of formula solids |
|---|---|---|---|---|
| Bisphenol-A/diluent solution of Example 2 | 21.5 | 100 | 7.2 | 5.1 |
|  |  |  | 14.3 | 10.3 |
| EPON 1001 solution of Example 3 | 33.8 |  | 20.3 | 14.55 |
|  |  |  | 13.5 | 9.70 |
| Additional Diluent M 140 | 8.2 | 100 | 8.2 | 5.91 |
| Cationic epoxy backbone of Example 4 | 3.6 | 55.6 | 2.0 | 1.43 |
| Dibutyltinoxide pigment paste of Example 5 | 6.5 |  | 2.0 | 1.44 |
| Cationic grind vehicle used in Example 5* | * |  | 1.0 | 0.72 |
| M151 diluent* | * |  | 2.4 | 1.74 |
| Butyl CELLOSOLVE* | * |  | 0.0 | 0.00 |
| IRGACOR 1173, UV initiator available from BASF | 3.27 | 100 | 3.27 | 2.35 |
| Totals | 143.9 |  | 139.2 | 100.00 |

*included in Dibutyltinoxide pigment paste of Example 5; not added separately

Examples 7A and 7B

The following examples illustrate diluent additions to the basic formulation of Example 6.

The following were weighed into two-ounce glass jars and mixed by hand to yield lower viscosity formulations: weights are in grams

| Material | 7A | 7B |
|---|---|---|
| Formulation of Example 6: | 9.0 | 9.0 |
| M-140 phenol acrylate | 0.9 | 1.8 |
| Butyl CARBITOL formal | — | 0.9 |
| IRGACOR 1173, available from BASF | 1 drop = .03 g | 2 drops = .06 g |
| Totals | 9.9 | 11.8 |
| Viscosity (10 sec$^{-1}$, 25° C.), cps | 1330 | 430 |

Example 8

This example illustrates testing of the Dual Cure formulations of Examples 7A and 7B.

Steel panels which are still completely covered in oil but which have their amount of oil ameliorated or reduced were prepared as follows: A 4-inch by 12-inch×0.030″ oily steel panel (Item No. 28110 from ACT Test Panels LLC of Hillsdale, Mich.) was dry rubbed 20 to 25 times with a paper tissue supplied as "Assembly Wipes" and the process repeated once. Pieces of the oily steel were weighed before and after solvent wiping with aliphatic hydrocarbon and then acetone. It was determined that the oil remaining on the panels ranged from 0.12 to 0.14 grams per square meter for the dry-rubbed oily panels. The amount of oil on the steel as received, as determined by the same method, was 0.6 to 0.8 grams per square meter.

The coating compositions of Example 7A and 7B were applied to approximately half of the 4-inch by 12-inch panel in a stripe on one side so that a "drawdown" of approximately 2 inches by 11 inches resulted on one side of the oily steel panel.

The panels were cured in an air environment using an Ultraviolet curing oven equipped with a moving belt. Two lamps were used and the panels carried through the oven at 19 feet per minute. The dosage of ultraviolet radiation was 0.995 Joules/cm$^2$ with a peak wattage of 0.473 watts/cm$^2$.

At this point the panels were tested for adhesion using a scribing tool having 8 knife blades 2 millimeters apart which makes cuts through the coating down to and into the bare metal. The panels is "crosshatched" by drawing the scribing tool once for a distance of approximately one inch followed by a second cutting action at 90° to the first cuts. A strong fiber containing tape (SCOTCH 898) is applied to the scribed area and the tape is vigorously pressed against the coating. The tape is then pulled upwards quickly to test the adhesion. Using this procedure, both Examples 7A and 7B were rated as a "10" which means there was no pick-off or loss of adhesion between the coating and the oily steel. A "10" is distinguishable from a "9" rating in that while both represent "pass" conditions, a "9" rating will have some ragged or uneven edges to the cuts after scribing and taping.

Additional panels from the application of Examples 7A and 7B were baked using a normal baking condition for electrocoat primers used for corrosion resistance. After baking the (ameliorated) oily panel/Dual Cure Examples 7A and 7B for 25 minutes at 350° F., the panels were tested for solvent resistance by rubbing vigorously for 100 double rubs with a cheesecloth material soaked with acetone. For both 7A and 7B there was approximately no effect of the solvent rubbing and some drag or resistance was noted. This level of solvent resistance is in the range of commercial electrocoats.

| Material | Modification of Example 6 | Viscosity 25° C., cps** | X Hatch after UV on oily steel* | X Hatch after Full Bake* | DFT full bake, mils |
|---|---|---|---|---|---|
| Example 6 | none | 2880 | 10 | 10 |  |
| Example 7A | 10% M140 | 1330 | 10 | 10 | 0.67 to 0.7 |
| Example 7B | 20% M140, 10% butyl CARBITOL formal | 430 | 10 | 10 | 0.63-0.67 |

*Panels are visually rated on a scale of 0 to 10, wherein "0" indicates compete removal of the coating from the cross-hatched area and "10"indicates no removal of the coating from the cross-hatched area.
**Cone and plate 10 rpm = 10 second$^{-1}$ Additional panels were tested for corrosion resistance. Panels having the Dual Cure Hem coatings of Example 7A and 7B covering approximately half of a 4-inch by 4-inch panel were cleaned using an alkaline cleaner representative of cleaning in automobile manufacturing. A 5-gallon plastic pail containing CHEMKLEEN 166 HP type alkaline cleaner (available from PPG Industries, Inc.) was stirred using an immersion circulator at 141° F. which is on the high end of temperature ranges used for cleaning and pretreating of automobiles. The 4-inch by 4-inch panels of this example were cleaned for 2 minutes with the circulator set on its "high" setting for stirring speed, rinsed well with deionized water and then blown dry. After alkaline cleaning the panels were electrocoated using a cationic electrocoat "ED-7" available from PPG Industries at its recommended film thickness of 0.6 mils and baked for 25 minutes in an electric oven set at 350° F. air temperature.

The panels can therefore compare the corrosion resistance of a commercial electrocoat over bare steel to the corrosion resistance of the Dual Cure Hem coating over oily steel. The test can also probe for any problem in compatibility between the two coatings where they intersect. Regardless of how accurately or inaccurately the Dual Cure Hem coating is applied, it must at some point connect and join with the electrocoat used on the manufactured article. Ideally the border between the two coatings will be seamless and problem-free. For the cyclic corrosion tests the panels were scribed across and at 90 degrees to the line of intersection and joining of the two coatings so that their respective corrosion resistance could be compared directly.

The panels were subjected to two standard cyclic corrosion tests, Ford APG for 32 cycles and GM 9540P for 40 cycles and the results are summarized below:

| Coating | Ford APG (32) total scribe creep | GM 9540P (40) total scribe creep |
| --- | --- | --- |
| Example 7A | 7.0-8.1 | 17.4 |
| ED 7 on same panel as 7A | 6.5-9.0 | 15.9 |
| Example 7B | 7.7-9.0 | 12.2 |
| ED 7 on same panel as 7B | 7.1-9.7 | 13.1 |

There is no corrosion apparent at the seams between the Dual Cure Hem coatings of examples 7A and 7B and the conventional electrocoat.

What is claimed is:

1. A film-forming composition capable of undergoing dual cure, comprising:
   (1) a resin component comprising at least one polyepoxide; and
   (2) a radiation-curable diluent comprising a reaction product of a composition comprising:
      (a) a partially capped polyisocyanate; and
      (b) an ethylenically unsaturated monomer having active hydrogen functional groups capable of reacting with isocyanate groups, wherein the ethylenically unsaturated monomer comprises an aminoalkyl acrylate or an hydroxylalkyl acrylate.

2. The composition of claim 1, wherein the polyepoxide has an epoxy equivalent weight less than 200 g/equivalent.

3. The composition of claim 2, wherein the resin component (1) comprises at least two polyepoxides.

4. The composition of claim 3, wherein at least one of the polyepoxides has an equivalent weight of 450 to 550 g/equivalent, and is present in an amount of 10 to 15 percent by weight, based on the total weight of resin solids in the film-forming composition.

5. The composition of claim 1, wherein at least one of the polyepoxides comprises polyglycidyl ethers of polyhydric phenols.

6. The composition of claim 1, wherein the resin component (1) further comprises a polyhydric phenol.

7. The composition of claim 1 wherein the partially capped polyisocyanate comprises an aromatic polyisocyanate.

8. The composition of claim 7 wherein the aromatic polyisocyanate comprises toluene diisocyanate.

9. The composition of claim 1 wherein the ethylenically unsaturated monomer comprises at least one hydroxyl functional monomer.

10. A process for improving corrosion resistance of a metal substrate comprising:
   (a) applying to the substrate a film-forming composition capable of undergoing dual cure, said film-forming composition comprising:
      (1) a resin component comprising at least one polyepoxide; and
      (2) a radiation-curable diluent comprising a reaction product of a composition comprising:
         (i) a partially capped polyisocyanate; and
         (ii) an ethylenically unsaturated monomer having active hydrogen functional groups capable of reacting with isocyanate groups, wherein the ethylenically unsaturated monomer comprises an aminoalkyl acrylate or an hydroxylalkyl acrylate;
   (b) exposing the substrate to actinic radiation to effect polymerization of ethylenically unsaturated groups in the radiation-curable diluent;
   (c) electrophoretically depositing on the substrate a curable, electrodepositable coating composition comprising:
      (1) a resin component containing an active hydrogen-containing, cationic salt group-containing resin comprising an acrylic, polyester, polyurethane and/or polyepoxide polymer; and
      (2) an at least partially capped polyisocyanate curing agent; and
   (d) heating the substrate to a temperature and for a time sufficient to effect cure of the polyisocyanates and active hydrogen functional groups.

11. The process of claim 10, wherein the polyepoxide in the film-forming composition capable of undergoing dual cure has an epoxy equivalent weight less than 200 g/equivalent.

12. The composition of claim 11, wherein the resin component (1) in the film-forming composition capable of undergoing dual cure comprises at least two polyepoxides.

13. The composition of claim 12, wherein at least one of the polyepoxides in the film-forming composition capable of undergoing dual cure has an equivalent weight of 450 to 550 g/equivalent, and is present in an amount of 10 to 15 percent by weight, based on the total weight of resin solids in the film-forming composition capable of undergoing dual cure.

14. The process of claim 10, wherein at least one of the polyepoxides in the film-forming composition capable of undergoing dual cure comprises polyglycidyl ethers of polyhydric phenols.

15. The process of claim 10, wherein the resin component (1) in the film-forming composition capable of undergoing dual cure further comprises a polyhydric phenol.

16. The process of claim 10 wherein the partially capped polyisocyanate used to prepare the radiation-curable diluent comprises an aromatic polyisocyanate.

17. The process of claim 16 wherein the partially capped polyisocyanate comprises toluene diisocyanate partially capped with 2-ethylhexanol.

18. The process of claim 10 wherein the ethylenically unsaturated monomer comprises at least one hydroxyl functional monomer.

19. The process of claim 10 wherein the cationic salt groups are amine salt groups.

20. The process of claim 10 wherein the substrate is cold rolled steel.

* * * * *